United States Patent
Yagawa et al.

(10) Patent No.: US 6,801,713 B1
(45) Date of Patent: Oct. 5, 2004

(54) RECORDED PROGRAM VIEWING SUPPORT METHOD

(75) Inventors: Yuichi Yagawa, Kawasaki (JP); Hiromi Ukai, Kawasaki (JP); Akira Tanaka, Kawasaki (JP); Hideo Nishijima, Yokohama (JP); Hitoaki Owashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/647,449

(22) PCT Filed: Jul. 1, 1998

(86) PCT No.: PCT/JP98/02962
§ 371 (c)(1),
(2), (4) Date: Nov. 17, 2000

(87) PCT Pub. No.: WO00/02386
PCT Pub. Date: Jan. 13, 2000

(51) Int. Cl.[7] .............................................. H04N 5/91
(52) U.S. Cl. .............................. 386/69; 386/70; 386/83
(58) Field of Search ............................. 386/1, 45, 6–8, 386/68–70, 81, 82, 83, 125, 126; 358/908; 348/700, 14.05; 725/44, 100

(56) References Cited

U.S. PATENT DOCUMENTS 6,233,734 B1 * 5/2001 Macrae et al. ................. 725/44
6,311,011 B1 * 10/2001 Kuroda ........................ 386/83
6,476,825 B1 * 11/2002 Croy et al. ............... 348/14.05
6,493,876 B1 * 12/2002 DeFreese et al. ........... 725/100
6,701,060 B2 * 3/2004 Yuen et al. .................... 386/83

FOREIGN PATENT DOCUMENTS

| JP | 4-89682 | 3/1992 |
| JP | 7-45050 | 2/1995 |
| JP | 9-294237 | 11/1997 |

* cited by examiner

Primary Examiner—Thai Tran
Assistant Examiner—Christopher Onuaku
(74) Attorney, Agent, or Firm—McDermott Will & Emery LLP

(57) ABSTRACT

A support method for helping the user find a desired program from a collection of recorded television programs easily and quickly, and a recording/reproducing apparatus using this method. The recorded program viewing support system, when recording a television program, records electronic program information on the program, classifies the electronic program information according to predefined program category criteria, and successfully assigns predefined category numbers (recording channels) to the program to be recorded. Before the user views a recorded program, the user specifies the number of the recorded channel. A recorded channel number is allocated with a category item and hence the user can easily know the contents of the recorded programs. The user can change the channel number successively or directly specify it by using a remote controller to find a desired program easily and quickly. When disk media such as HDD and DVD-RAM are used as a storage in particular, the recorded programs can be randomly accessed allowing the user to zap through recorded programs.

20 Claims, 20 Drawing Sheets

FIG.12

600 "electronic program information (EPG)"

| | | | | |
|---|---|---|---|---|
| 601 — channel<br>name of channel | 123xx<br>channel 1 | 246yy<br>channel 2 | ... |
| 602 — name of program | x time | YY Information Station | ... |
| 603 — broad-casting date and time | year | 1997 | 1997 | ... |
| | month | December | December | ... |
| | day | 21 | 21 | ... |
| | time | 18:00 | 18:05 | ... |
| | day of week | Sunday | Sunday | ... |
| 604 — duration (minutes) | 60 | 115 | ... |
| 605 — category | news/ overall | news/ domestic/ variety show/ cooking | ... |
| 606 — purchase price | 0 | 100 | ... |
| 607 — sound, language | bilingual | stereo | ... |
| 608 — others | dactylological broadcasting | text broadcasting | ... |
| 609 — program information | reporting general news such as politics, incidents and accidents in comprehensive way | connecting local broadcasting stations and corner titled "local dishes" gaining popularity | ... |
| 610 — performer | aaa<br>bbb | ccc<br>ddd | ... |
| 611 — keyword | politics, incidents, accidents, general news | domestic, each district, broadcasting station, local dish corner, popularity | ... |
| 612 — series | last | 24 | ... |

700 channel definition table

| channel set | | program attributes | program information |
|---|---|---|---|
| first number | last number | | |
| CH001 | CH020 | category | dramas |
| CH021 | CH040 | category | movies |
| CH041 | CH060 | category | sports |
| CH061 | CH080 | category | local and world news |
| CH081 | CH090 | category | variety shows |
| CH091 | CH100 | category | others |
| CH101 | CH110 | performer | Miss so-and-so |
| CH111 | CH120 | key word | sports meetings |
| ... | ... | ... | ... |

800 channel assignment table

| channel number | name of program | recording date and time ||| length of recording (minutes) | length of viewing (minutes) | saving mark | storage location ||
|---|---|---|---|---|---|---|---|---|---|
| | | year | month | day | time | | | | start point | end point |
| 001 | First love | 1998 | 2 | 09 | 20:00 | 60 | 20 | × | 0x5001 | 0x5500 |
| 002 | Ganbare Seisyun | 1998 | 2 | 10 | 21:00 | 60 | 0 | × | 0x6001 | 0x6500 |
| 003 | Onna kacho Saotome Yuri | 1998 | 2 | 11 | 20:00 | 60 | 0 | × | 0x6501 | 0x7000 |
| 021 | A trip to strangeness in 2048 | 1998 | 2 | 07 | 21:00 | 120 | 20 | ○ | 0x2001 | 0x3000 |
| 022 | My boyfriend | 1998 | 2 | 08 | 21:00 | 120 | 0 | ○ | 0x4001 | 0x5000 |
| 041 | An opening ceremony of a sports meeting | 1998 | 2 | 07 | 11:00 | 120 | 0 | ○ | 0x501 | 0x1500 |
| 042 | World soccer | 1998 | 2 | 08 | 13:00 | 120 | 40 | × | 0x3001 | 0x4000 |
| 081 | Wakuwaku dobutsumura | 1998 | 2 | 07 | 18:00 | 60 | 60 | × | 0x1501 | 0x2000 |
| 091 | Hoso to kyoiku | 1998 | 2 | 10 | 18:00 | 60 | 20 | × | 0x5501 | 0x6000 |
| 111 | An opening ceremony of a sports meeting | 1998 | 2 | 07 | 11:00 | 120 | 0 | ○ | 0x501 | 0x1500 |
| ... | ... | ... | | | | | | | | |

801 802 803 804 805 806 807 808 809 810 811
821 822 823 824 825 826 827 828 829 830

1000 display of channel definition

| select CH and press OK button | | |
|---|---|---|
| CH001-020 | category | drama |
| CH021-040 | category | movie |
| CH041-060 | category | sport |
| CH061-080 | category | local and world news |
| CH081-090 | category | variety show |
| CH091-100 | category | others |
| CH101-110 | performer | Miss so-and-so |
| CH111-120 | keyword | sports meeting |

1001 (points to CH061-080 row)

previous display — 1002
next display — 1003
end — 1004

1100 display of recorded program

1103 NEW
1101
1102 video : 042 world soccer

RECORDED PROGRAM VIEWING SUPPORT METHOD

BACKGROUND OF THE INVENTION

The present invention relates to a system and apparatus for supporting a user to see a video in an apparatus for recording and playing TV programs. Particularly, it relates to a system for supporting a user to search for his/her desired program from a group of recorded TV programs easily and quickly and an apparatus using the system. This apparatus includes a video player/recorder, recorder and player.

In the prior art, there are roughly the following two methods of searching for TV programs recorded by a user.

Firstly, one of them is a method of searching while actually looking at a video by fast forwarding or rewinding a recorded program. In recent years, a video recorder has come into existence which facilitates searching for a TV program while listening to sound by doubling the image speed and maintaining the sound speed at a normal level. To increase the efficiency of retrieval, great efforts have recently been made to increase the fast forward speed and the rewind speed.

Secondly, the other is a method of indexing programs at the time of recording and searching for a desired program by displaying a list of the indices on the screen. Generally speaking, recording date and time are used as indices. It is considered that information which can be acquired as the attributes of a program by a video recorder are currently only recording date and time. In the video recorder, a list of the recording times and dates of TV programs is displayed on the screen so that a user can search for his/her desired program from the list while recollecting his/her recording date and time.

Along with the digitization of TV broadcasting, electronic information on TV programs is multiplexed in broadcasting and aired. This electronic program information is generally called EPG (Electronic Program Guide). EPG includes key words such as the title, category and performers of each program. Current digital satellite broadcasting enables a user to select his/her desired channel by displaying this EPG on the screen. As for terrestrial broadcasting, a service for broadcasting electronic program information embedded in VBI (Vertical Blanking Interval) which is an unused area will be shortly started.

When progress is made in this broadcasting service, the third method that information contained in EPG is used as retrieval indices is easily conceivable. In this case, when a program is recorded, EPG is also stored. To see a recorded program, the titles of recorded programs are listed on the screen ad a user selects his/her desired program from this list.

A description is subsequently given of the function of a video recorder related to the present invention. This function is not always necessary to carry out the present invention.

Along with the spread of digital broadcasting, apparatuses for recording a digital video will come into existence. Since the high compression of a digital video can be expected from the digital video recorders, a large number of video programs can be recorded. Also, with the appearance of a DVD-RAM changer and an increase in the capacity of a hard disk, a larger number of video programs will be able to be recorded.

Further, the program recording function will be improved by using the above mentioned EPG. For example, it will be possible to record a program by directly specifying the title of the program or to automatically record a program having a keyword by specifying the keyword included in program information such as the category or performer of the program. Particularly, the user's history of viewing is analyzed to automatically record a program which seems to be the favorite of the user.

The present invention is particularly effective for a video recorder which has the above automatic recording function and can store a large number of video programs.

Subsequently, problems which are seen in the prior art will be reviewed.

In the first method, a user must always look at the screen until he/she finds out his/her desired program and fast forwarding and rewinding operations are complicated and troublesome. Since this method depends on user's intuition and memory, a user's burden is large. Particularly when a program is automatically recorded, user's intuition and memory cannot be relied upon any longer. As more and more video images are stored, the user's burden increases.

Since a video program is searched for with an index in the second method, the user's burden is slightly lightened. However, since index information is only recording date and time, it can be said that this method also depends on the intuition and memory of a user. Particularly, when a program is automatically recorded, it is difficult to recall the contents of the recorded program from its recording date and time.

Since EPG indicative of the contents of a program such as the title of a program is used as an index in the third method, the burden of user's intuition and memory is greatly lightened. That is, the user searches for his/her desired program while looking at the titles of programs. However, when a large number of recorded programs can be stored, the titles of all the recorded programs cannot be displayed on the screen and the retrieval of indices becomes complicated. Further, it is difficult to recall the contents of automatically recorded programs from program information alone.

It is therefore an object of the present invention to provide a system and apparatus for searching for a recorded video program easily and quickly.

It is another object of the present invention to provide a system and apparatus for searching for a user's desired program from a large number of automatically recorded video programs easily.

SUMMARY OF THE INVENTION

To attain the above objects, the present invention is constituted as described below. In a video recorder for recording a video, electronic video information related to videos and corresponding to each unit video is classified according to predetermined criteria of video classification and a class number based on the result of classification is assigned to each unit video to be recorded.

As an example, in the recorded video viewing support system of the present invention, when a video program is to be recorded, electronic program information on the program is recorded and classified according to predetermined criteria of program classification and a predetermined class number (record channel) is assigned to a recorded program.

The recording of electronic program information may be carried out at a time different from the time of recording a video program.

Further, the present invention includes the recording of not only a video program but also a sound program such as a radio program.

To see a recorded program, the recorded program corresponding to a record channel specified by a user (viewer) may be played. At this point, when an ordinary TV program is displayed during the playing of the recorded program at this point, the playing of the recorded program may be interrupted. Since program class items are assigned to record channel numbers, a user can easily recall the contents of a recorded program from a channel number. Further, the user can change the channel number sequentially or directly specify a channel number using a remote controller to search for a program that he/she likes to see easily and quickly. Particularly when a disk medium such as HDD or DVD-RAM is used as a recording medium, it is possible to zap through recorded programs because random access to the recorded program becomes possible. The present invention also provides a recording medium in which a class number (record channel) is recorded together with a movie. The present invention further includes a video camera and a sound recorder which record a class number.

The present invention provides a recorded video viewing support apparatus for supporting a TV program player/recorder to record programs, which can be connected to the TV program player/recorder capable of recording TV programs and playing recorded TV programs, which apparatus comprises means of classifying broadcast TV programs and electronic program information corresponding to the broadcast TV programs according to specified criteria of video classification and means of assigning class numbers according to classification results to recorded TV programs. The recorded video viewing support apparatus encompasses a recorded video viewing support apparatus comprising means of outputting the assigned class numbers to the TV program player/recorder. The recorded video viewing support apparatus further encompasses a recorded video viewing support apparatus which comprises means of storing the assigned class numbers and allows the TV program player/recorder to play a TV program recorded by the TV program player/recorder based on the stored class number and a number related to the class number and input from a viewer.

Further, the present invention provides a video recording medium which is capable of recording video information and can be played by a video player, wherein class numbers related to recorded video information and corresponding to classification results of electronic video information on videos based on the predetermined criteria of video classification are assigned to recorded video information and stored, and the video information is played when the channel selection button of a remote controller of a video player or a TV receiver used in conjunction with the video player is selected if the selected number is a stored class number. The number may be input from a device other than the remote controller. The remote controller is not the remote controller of the video player or TV receiver. Further, the number related to a class number does not need to be equal to the class number.

BRIEF DESCRIPTION OF THE DRAWINGS

FIG. 12 is a diagram for explaining the constitution of a program information database in the first, second, third and fourth embodiments of the present invention.

FIG. 13 is a diagram for explaining the constitution of a channel definition table in the first, second, third and fourth embodiments of the present invention.

FIG. 14 is a diagram for explaining the constitution of a channel assignment table in the first, second, third and fourth embodiments of the present invention.

DESCRIPTION OF THE PREFERRED EMBODIMENT

Preferred embodiments of the present invention will be described hereinafter with reference to the accompanying drawings.

(The First Embodiment)

The first embodiment will be first described. The first embodiment is a video player/recorder 120 which the present invention is applied to.

Figure 19:
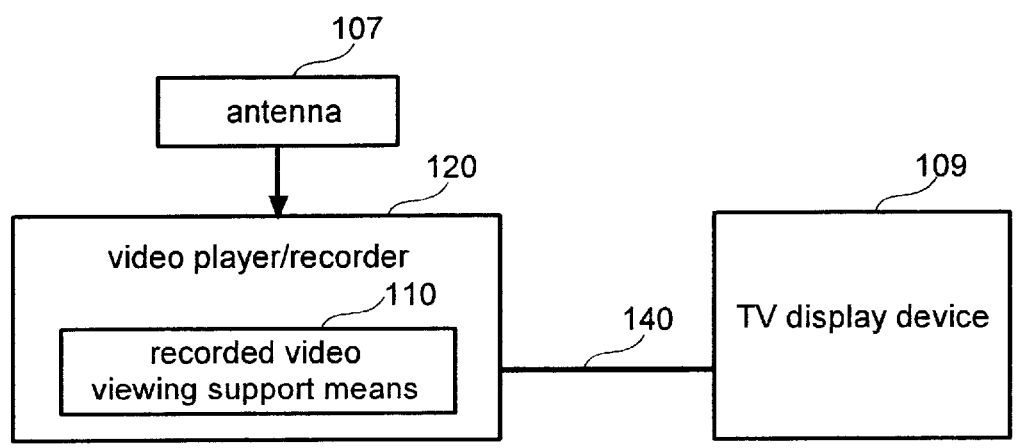
FIG. 19 is a diagram for explaining the constitution of an apparatus according to the first embodiment of the present invention.

Firstly, FIG. 19 shows the constitution of the apparatus of this embodiment. The video player/recorder 120 records a TV program received from an antenna 107 and plays the recorded program (recorded TV program, may be simply referred to as "video") on a TV display device 109. As understood from FIG. 19, recorded video viewing supporting means 110 is incorporated in the video player/recorder 120.

TV broadcasting is terrestrial broadcasting (analog), CATV (analog) or satellite broadcasting (analog, digital) all of which are currently available. As for digital terrestrial broadcasting and CATV which will be made available in the future, their broadcasting systems are expected to be the same as digital satellite broadcasting. Therefore, the present invention can be applied to these services as well. Particularly, EPG (Electronic Program Guide which will be detailed hereinafter) to be handled in the present invention will be multiplexed with a video and broadcast.

The TV display device 109 which conforms to the current TV broadcasting system such as NTSC, PAL or SECAM is imagined. In this case, the TV display device 109 and the video player/recorder 120 are connected by an analog AV cable 140. When the TV display device incorporates a digital video decoder, a cable capable of digital transmission such as a plastic optical fiber cable is used.

Figure 1:
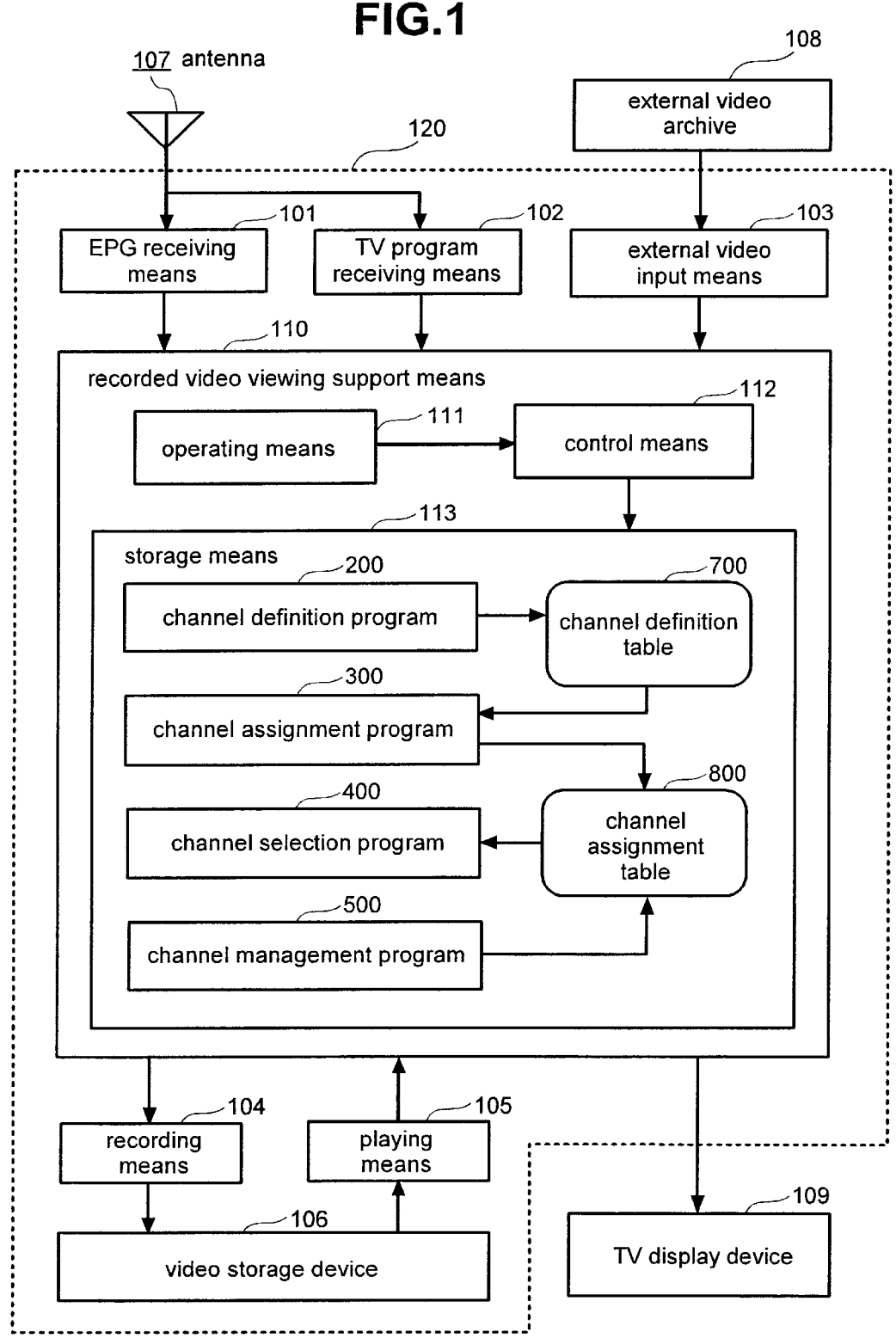
FIG. 1 is a diagram for explaining the constitution of a system according to the first, second, third and fourth embodiments of the present invention.

FIG. 1 shows the constitution of the system of this embodiment. The video player/recorder 120 comprises EPG receiving means 101, TV program receiving means 102, external video input means 103, recording means 104, playing means 105, video storage device 106 and recorded video viewing supporting means 110. The video player/recorder 120 is connected to the antenna 107, the external video archive 108 and TV display device 109. In FIG. 1, the TV display device 109 and the video player/recorder 120 are separate units but they may be integrated into a single unit (see FIG. 20). The video player/recorder 120 may be a recorder without a playback function. The video player/recorder 120 may be a video player, having no recording function, for playing a program recorded by a recorder (or a player/recorder) to which the present invention is applied. In the current digital satellite broadcasting, images, sound and data are multiplexed and broadcast. The EPG receiving means 101 extracts EPG data from a signal received by the antenna 107. The TV program receiving means 102 extracts the images and sound of a specific program. The processing of receiving this digital satellite broadcasting is detailed in the Video Information Media Society's bulletin Vol. 51, No. 9, 1997, pp. 1364(30)–1369(35).

Like an ordinary video player/recorder, a video which can be recorded in this embodiment is not limited to a broadcast program. The video player/recorder 120 comprises external video input means 103 to record a video input from the external video archive 108. Stated more specifically, a video taken by a user can be handled.

The external video archive 108 may record a class number (record channel) like the video player/recorder 120. In this case, means of recording information indicating the contents of a recorded program is provided in place of the EPG receiving means. This means may be means of inputting information when (or before or after) a cameraman shoots in the external video archive 108. Information may be a class number or record channel in addition to shooting contents (shot person, scenery or object, shooting time and date, etc.). The shooting contents may be analyzed to create information. Further, the recorded video viewing supporting means 110 may be separate from the video player/recorder.

This embodiment is based on condition that a video is recorded as digital signals. To record an analog broadcast program, the recording means 104 comprises an AD converter, digital video compression CODEC (encoder) and means of writing data to a storage device. To record a digital broadcast program, the recording means 104 comprises only writing means. As a matter of course, digital recording is not an absolute condition in the present invention and analog recording is also possible. The effect of the present invention is expected more for digital recording than analog recording.

Since this embodiment is based on condition that analog signals are output to the TV display device 109, the playing means 105 comprises means of reading data from the storage device, digital video extension CODEC (decoder), DA converter and TV signal converter. As a matter of course, analog playback is not an absolute condition in the present invention but digital playback is also possible. However, as a TV display device into which digital signals can be input is not yet to be available on the market, analog playback which is expected to be more popular will be described in this embodiment.

The video storage device 106 is a random accessible disk medium such as hard disk (HDD) or DVD-RAM, or a tape medium which enables sequential access. Particularly HDD is a storage medium appropriate in this embodiment because the density of HDD is increasing more and more. Meanwhile, as DVD-RAM has a too small memory capacity to be used in this embodiment, a disk changer must be provided to enable a plurality of DVD-RAM disks to be used at the same time. A tape may be used as a storage medium in this embodiment. Since a tape is a relatively inexpensive medium, it is advantageously used to reduce the costs of the apparatus. The video storage device 106 may not be one of the constituent elements of the video player/recorder 120 and may be detachable.

The recorded video viewing support means 110 comprises operating means 111, control means 112 and storage means 113. Generally speaking, a remote controller is used as the operating means in the video player/recorder. A microcontroller is used as the control means 112. A random accessible memory is used as the storage means 113. Programs and data which the control means 112 refers to are temporarily stored in the storage means 113. As a matter of course, the recorded video viewing support means 110 also comprises storage means of storing programs and data constantly.

The programs stored in the storage means 113 include a channel definition program 200, a channel assignment program 300, channel selection program 400 and channel management program 500. The storage means 113 manages a channel definition table 700 and a channel assignment table 800 as data tables. Electronic program information 600 received from the EPG receiving means 101 is also managed by the storage means 113. Although only programs and data characteristic to the present invention are specified in this embodiment, programs and data such as a program for controlling various devices are required for a whole system.

The programs and data are executed by the control means 112. Input from the operating means 111 is used for a program which requires the operation of a user. The constitutions of data tables and the processing flows of programs will be described hereinafter.

The processing flow in FIG. 1 will be explained briefly, focusing on the characteristic part of the present invention.

To record a TV program, the TV program to be recorded is received by the program receiving means 102 and recorded in the video storage device 106 by the recording means 104. In the present invention, the following processing is executed in addition to this processing.

A TV program and EPG on this TV program are first received by the EPG receiving means 101. EPG means electronic program information. That is, EPG includes information on a recorded TV program. A service for broadcasting a TV program and EPG multiplexed with the TV program has already been offered though it will be detailed hereinafter.

EPG and a TV program may not be received at the same time. For example, EPG for several programs is first received at the beginning of each day and the TV programs are received later.

Thereafter, the recorded video viewing support means 110 judges the contents of a recorded TV program (to be simply referred to as "recorded program" or "video" hereinafter) from EPG and assigns an appropriate number to the recorded program based on the result of judgment. The contents of EPG may contain a number itself. Since the contents of EPG and the number are correlated with each other based on a certain rule, some significant number is assigned to the recorded program. That is, like the channels of the current TV broadcasting receiver (to be referred to as "TV" hereinafter), videos can be handled integrally using numbers. Then, in the present invention, the numbers are called "channel numbers" and the numbered recorded programs are called "channels" (or "record channels" to distinguish them from TV broadcast programs). The relationship between the contents of EPG and the assigned number may be changed by a user. Alternatively, this relationship may be sent from the broadcasting station.

To play a recorded program, a user specifies a channel number to search for a desired recorded program unlike an ordinary video player/recorder. The recorded video viewing supporting means 110 searches for a recorded program corresponding to the channel number. The playing means 105 plays and displays the recorded program on the TV display device 109.

As for how a user specifies a channel, the user directly inputs a channel number with the remote controller or changes the channel sequentially. These operation methods are the same as when viewing TV programs. That is, the present invention can provide user comprehensible and friendly "Look & Feel" when a user sees a video. The number input by the user and the number assigned by the apparatus may the same or different. When they are different, they may be correlated with each other.

When the number is contained in EPG, the number may be a user selection number as it is. A number input by the user may be assigned from information other than the number contained in EPG.

A predetermined specific program information is assigned to each channel and each recorded program is assigned to the channel using EPG. Therefore, the user can estimate the contents of the recorded program from the channel number easily and search for his/her desired recorded program easily.

When a random accessible disk medium such as HDD or DVD-RAM is used in the video storage device 106, data can be sought quickly, thereby making it possible to switch recorded programs to be played on a real time basis. The operation (called "zapping") of changing the channel to search for a desired program is carried out by a user very often with the current TV. According to the present invention, the video player/recorder 120 also allows for the zapping operation of changing the record channel at random to search for a desired recorded program.

The previously assigned numbers (channel numbers) and the video storage device 106 for storing a video are an embodiment of the present invention.

Further, when a special channel number is assigned to a video input from the external video archive 108, the video can be handled in the same manner as a broadcast program. As a result, the uniform video operation using channels is made possible with the whole video player/recorder.

Figure 2:
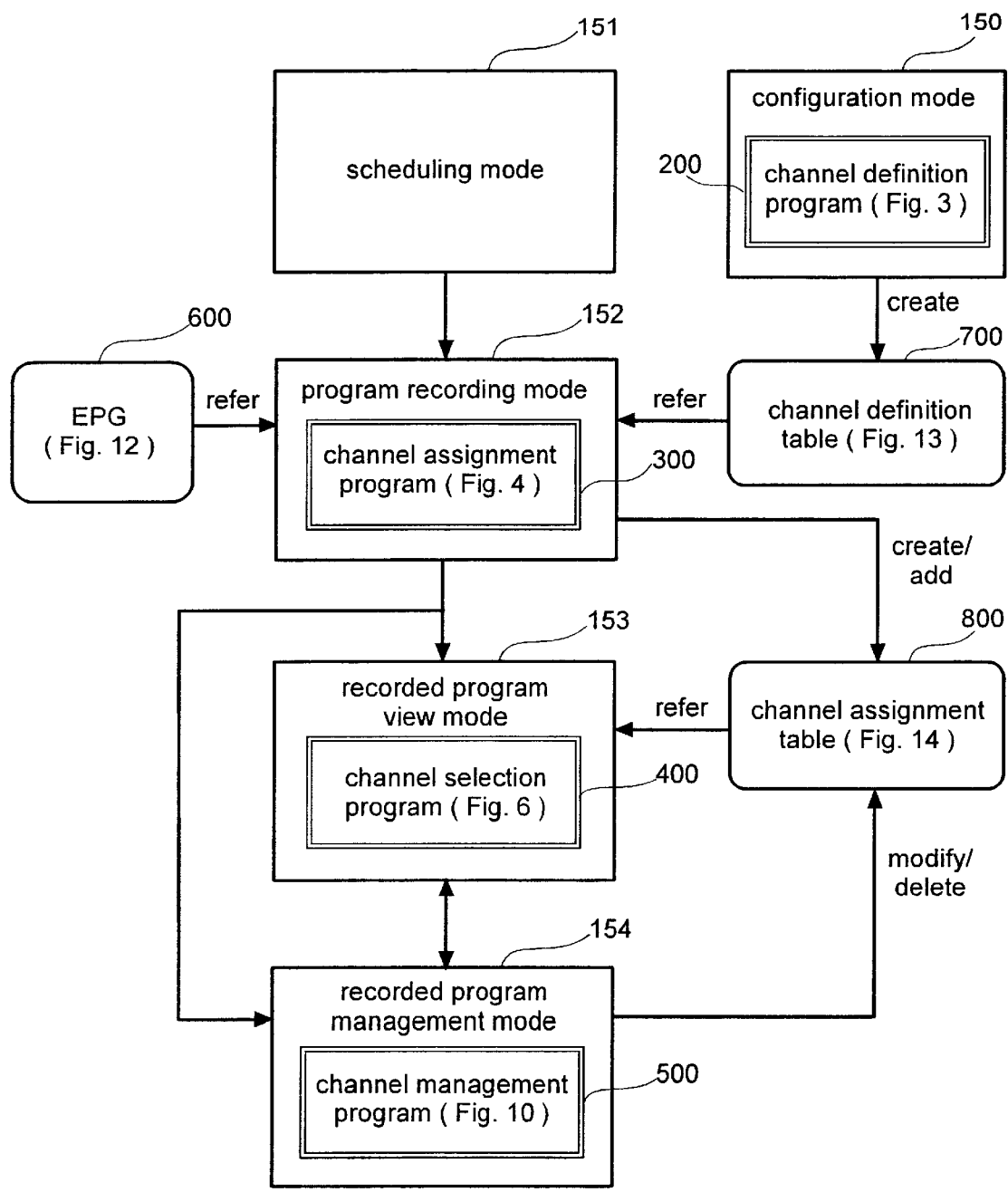
FIG. 2 is a diagram for explaining the whole procedure of a recorded video viewing supporting program in the first, second, third and fourth embodiments of the present invention.

FIG. 2 shows the total procedure of a recorded video viewing support program in the present invention.

First, in a configuration mode 150, the processing of setting the video player/recorder is carried out. The present invention is characterized in that the channel definition program 200 is provided in this configuration mode. The channel definition program 200 creates and edits a channel definition table 700 for correlating channel numbers with the contents of programs.

In the subsequent scheduling mode 151, a program to be recorded is recorded with a timer. Conventionally, the user recorded a program by specifying a time or a broadcasting station by himself/herself. In recent years, there have been proposed a method of specifying a program directly from an electronic program table prepared based on EPG and a method of automatically recording a program corresponding to a specified keyword indicative of the category or performer of the program. Particularly, Japanese Laid-open Patent Publication No.10-179992 proposes a method of automatically recording a program which seems to be a user's favorite by analyzing the user's history of viewing.

In the subsequent program recording mode 152, a TV program is recorded. Without scheduling, the user might specify direct recording. The present invention is characterized in that the channel assignment program 300 is provided in the program recording mode. With the channel assignment program 300, program information on a program to be recorded is acquired from EPG 600. A channel set to which the recorded program is assigned is obtained by checking the program information with the channel definition table 700. Further, an unused channel of the group of channels is secured from the channel assignment table 800 and assigned to the recorded program. This assigned channel number is managed by the channel assignment table together with information on the recorded program. In the subsequent recorded program view mode 153, the user sees the recorded program. The present invention is characterized in that the channel selection program 400 is provided in the recorded program view mode 153. With the channel selection program 400, a corresponding recorded program is retrieved from the channel assignment table 800 based on the channel number input by the user. The recorded program is then played.

Finally, in the recorded program management mode 154, such operation as the deletion or save of the recorded program is carried out. The present invention is characterized in that channel management program 500 is provided in the recorded program management mode 154. With the program, the channel number of the recorded program deleted by the user is released from the channel assignment table. The saving mark of a recorded program specified by the user to be saved is changed to ON with the channel assignment table to ensure that the program does not release the channel number automatically. The program automatically releases the channel number when there is a shortage of channel numbers.

Figure 15:
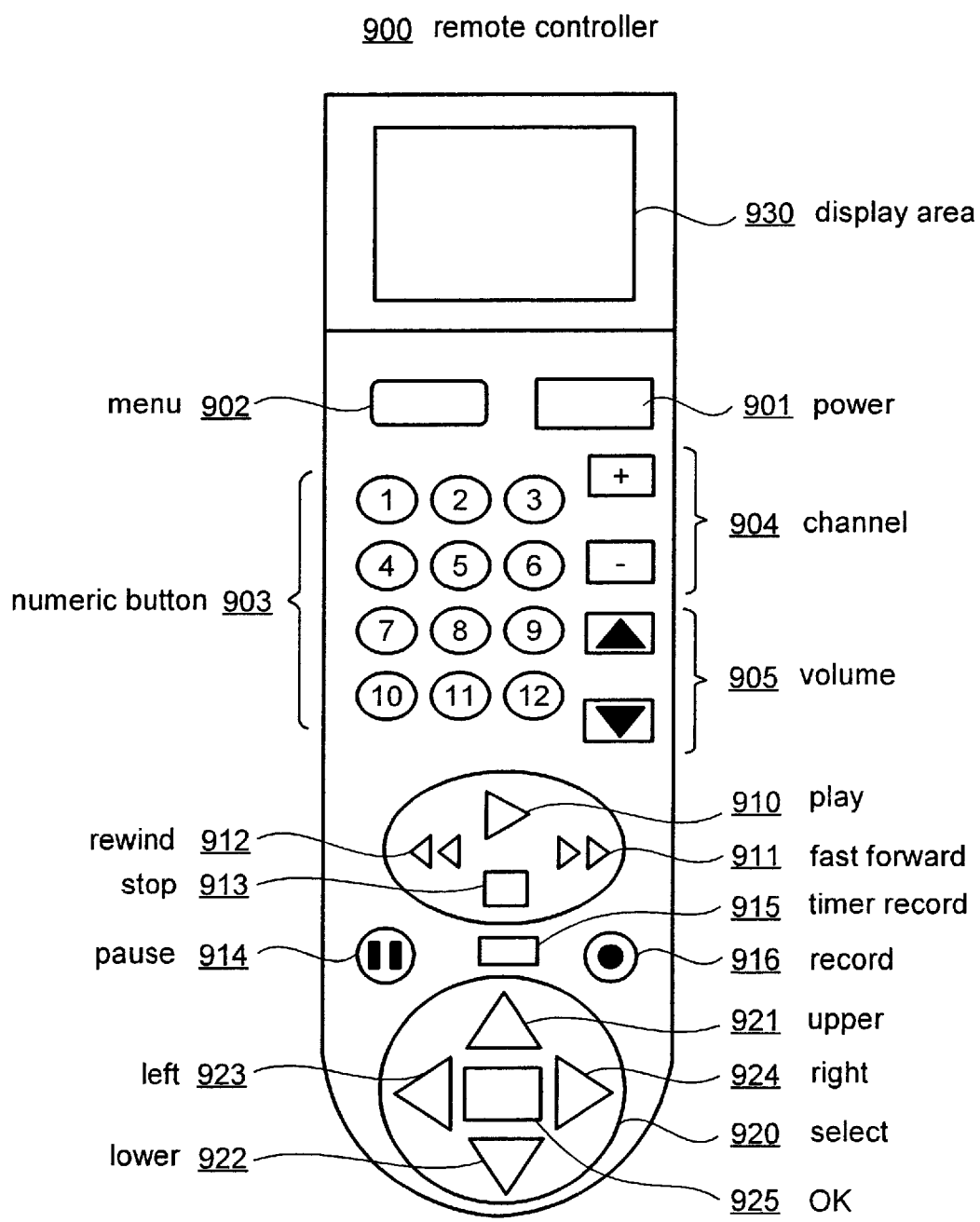
FIG. 15 is a diagram for showing the appearance of a remote controller used by a user in the first, second, third and fourth embodiments of the present invention.

FIG. 15 shows the appearance of the remote controller 900 operated by the user. Like an ordinary video remote controller, it comprises a power button, numeric button 903, channel button 904, volume button 905, play button 910, fast forward button 911, rewind button 912, stop button 913, pause button 914, timer record button 915 and record button 916. To allow the user to make settings, the remote controller 900 further comprises a menu button 902 and a group 920 of select buttons (upper button 921, lower button 922, left button 923, right button 924 and OK button 925).

When the user presses the menu button 902, a menu for setting the video player/recorder is displayed. The user sets parameters by moving from one candidate to another in each menu with the select buttons. The record channel is selected with the numeric button 903 or the channel button 904.

Each recorded program can be rewound, fast forwarded, paused or stopped as in an ordinary video recorder. When the user presses the play button 910, the program automatically starts from its final stop position.

The timer record button 915 is a button for the user to record a program with a timer. As for timer recording, please refer to Japanese Laid-open Patent Application No.10-179992. The record button 916 is a button for recording a program now on the air.

A description is subsequently given of the constitutions of data tables.

FIG. 13 shows the constitution of the channel definition table 700. In the channel definition table 700, program attributes and program information 704 are specified for each channel set. The expression "channel set" means a group of record channels having the same program attributes and defined by the first number 701 and last number 702 of a channel set. Channel sets 711 to 718 are taken as examples. Channel sets 711 to 716 are classified, for example, by the category of recorded programs. In the channel set 711, programs categorized into a group of dramas are allocated to channel numbers 001 to 020. In the channel set 716, programs which are not categorized into groups of dramas, movies, sports, local and world news and variety shows are allocated to channel numbers 091 to 100. In the channel set 717, programs where "Miss So-and-so" plays are allocated to channel numbers 101 to 110. The programs of "Miss So-and-so" who is a user's favorite can be always seen on the record channels 101 to 110. Similarly, in the channel set 718, programs on sports meetings are allocated to channel numbers 111 to 120. In the channel sets 717 and 718, channels already allocated in the channels groups 711 to 716 are allocated again and double definition or allocation is not prevented because it is considered that the user wanted to carry out further classification.

In the definition table, a record channel number is assigned to each program. One record channel number may be assigned to a plurality of programs. For example, one record channel number may be assigned to each program information on dramas or movies. One record channel number may be assigned to each broadcasting station. In this case, the broadcast channel number (channel number for selecting a TV broadcasting station) and the record channel number may be correlated to each other. For example, when the broadcast channel number is 4, the record channel number may be 14 (the first digit number is the same as that of the broadcast channel number). In this case, the broadcast channel number (channel number for selecting a TV broadcasting station) and the record channel number may be the same. In this case, to distinguish a recorded program from a program now on the air, a TV/video mode switching button is provided to display that the program now on the air is displayed if the button is set to a TV mode. A number other than broadcast channel number may be used as a record channel number.

FIG. 12 shows the constitution of EPG (Electronic Program Guide) 600. Program information (601 to 612) is stored for each program. The program information consists of channel (601), the name of a program (602), broadcasting time and date (603), duration (604), category (605), purchase price (606), sound, language (607), others (608), program information (609), the name of a person such as a performer (610), keyword (611) and series (612). Since the specifications of EPG are not standardized now, the constituent elements of program information transmitted from broadcasting stations as EPG differ from one another. Therefore, to actually operate the present invention, a program information creation program for establishing compatibility between different EPG specifications is required. EPG may contain a record channel.

EPG is also called "program guide" in digital satellite broadcasting and used to support a user to see a broadcast program. EPG in digital satellite broadcasting is detailed in the Video Information Media Academic Society's bulletin Vol. 51, No. 9, 1997, pp. 1364(30)–1369(35). A terrestrial broadcasting service for distributing EPG buried in a VBI area is expected to be available soon.

FIG. 14 shows the constitution of the channel assignment table 800. The channel assignment table 800 consists of a channel (CH) number 801, the name of a program 802, recording date and time (year 803, month 804, day 805, time 806), the length of recording 807, the length of viewing 808, saving mark 809 and location in storage (playback point 810, stop point 811). The channel number of the received broadcasting station and the name of the broadcasting station may be added to these. The recording date and time are year, month, day and time when the program is recorded. The length of recording 807 is a time length during which the program is recorded. As the user does not always record one program, the recording time length is not always the same as the broadcasting time of the program. The length of viewing 808 indicates the total time length during which the user has seen programs up till now. Based on the assumption that the user always sees a recorded program from the beginning, only the length of viewing is recorded. The viewing start time and the time length may be recorded. The saving mark 809 is used to indicate that the program will be seen by the user later. If this mark is not ON (in the figure), the system may automatically cancel channel settings. The location in storage is a location where the recorded program is actually stored. The playback program is used to load a recorded program from this location and play it.

The lines 821 to 830 in the figure show examples for respective channels. For example, the line 821 shows that a program titled "First Love" recorded at 20:00 on Feb. 9, 1998 is stored in the channel number 001 for 60 minutes. It is understood that the user saw that recorded program for 20 minutes and the saving mark is not ON.

When the channel assignment table 800 is compared with the channel definition table 700 (FIG. 13), recorded programs having channel numbers 001 to 003 are dramas, recorded programs having channel numbers 021 to 022 are movies, recorded programs having channel numbers 041 to 042 are sports, a recorded program having a channel number 081 is a variety show, and a recorded program having channel number 091 is another program. Although the channel number 111 has the same contents as the channel number 041, that channel number is assigned owing to the keyword "sports meeting". The user can see the "Sports Meeting Opening Ceremony" from both categories "sports" and "sports meeting".

A description is subsequently given of the processing flow of a program and examples of the screen.

Figure 3:
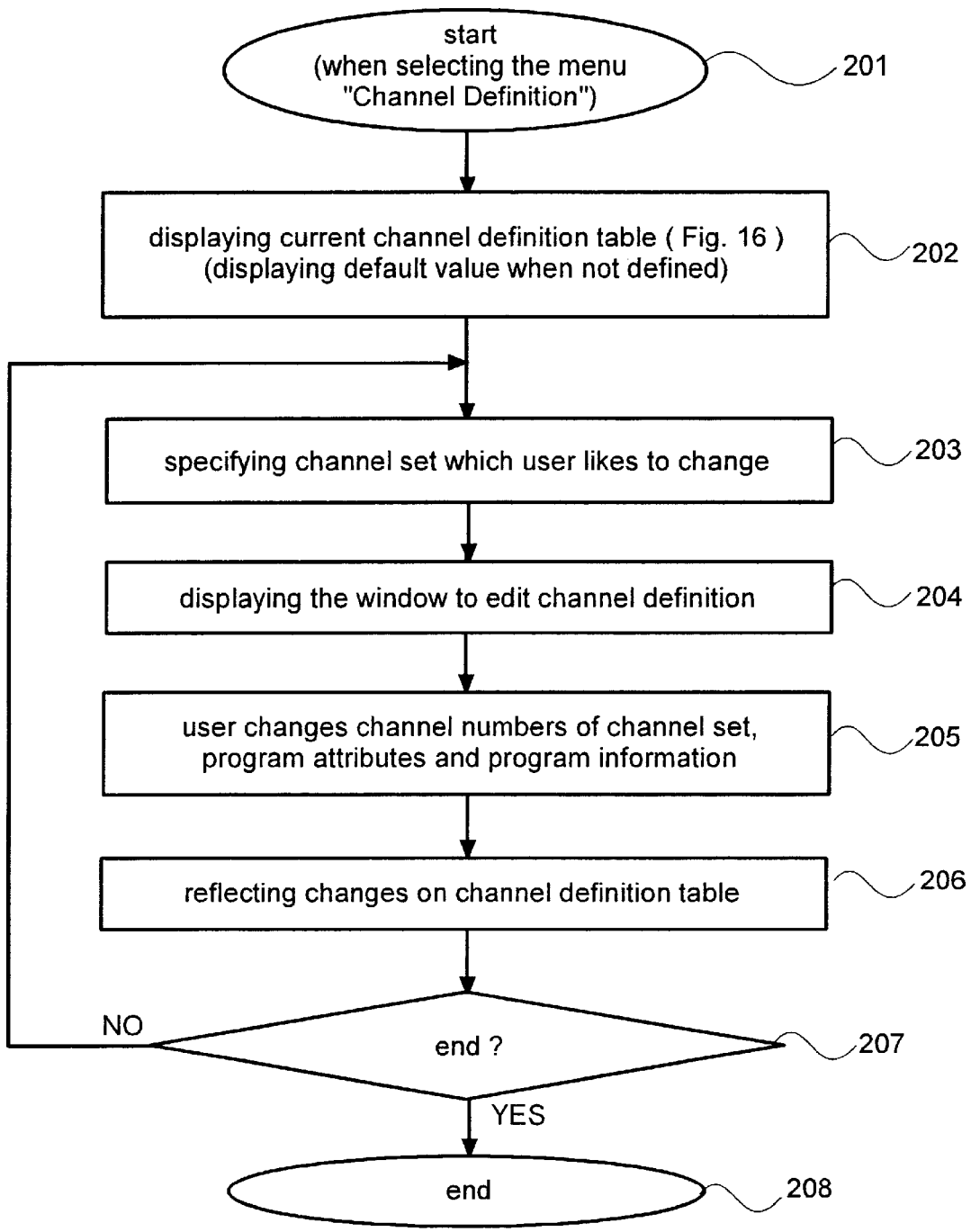
FIG. 3 is a diagram for explaining the processing flow of a channel definition program in the first, second, third and fourth embodiments of the present invention.

First, FIG. 3 shows the processing flow of the channel definition program 200. The program is executed when the user presses the menu button 902 by the remote controller and selects the menu "Channel definition" from a group of menus displayed. When the program is executed in step 201, the current channel definition table 700 is first displayed for the user. When the user do not define the channel definition table as right after the user has purchased the apparatus, the system displays a predetermined default value. This default value is set to cover as many general users as possible so that they do not have to change much.

Figures 16, 17:
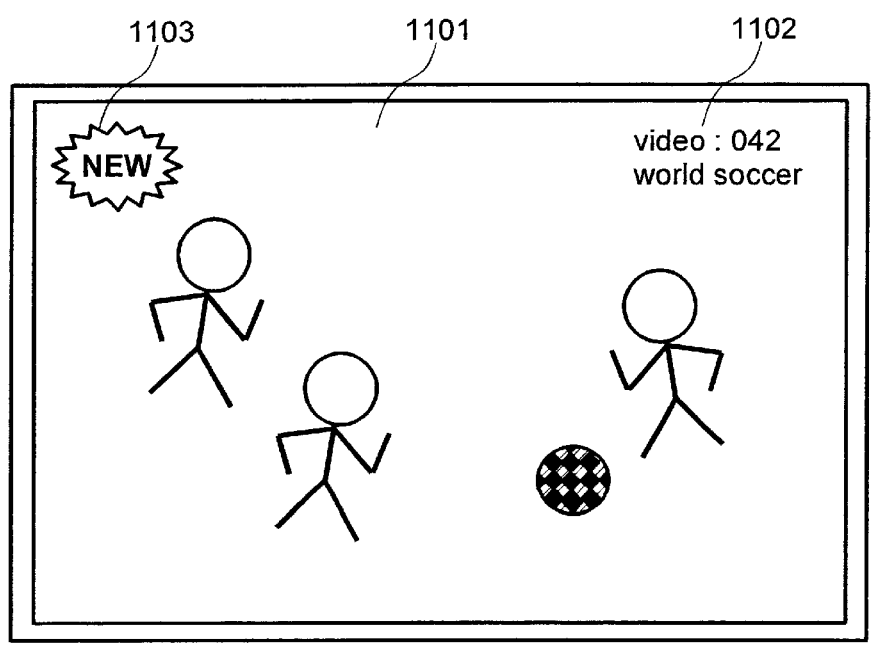
FIG. 16 is a diagram for showing the display of channel definition in the first, second, third and fourth embodiments of the present invention.
FIG. 17 is a diagram showing the display of a recorded program in the first, second, third and fourth embodiments of the present invention.

FIG. 16 shows the display of channel definition 1000. The channel definition table of FIG. 13 is displayed as it is. The user uses the select button 920 on the remote controller to select a channel set. On the screen, the selected area 1001 is lighted up according to the selection of the user. When the OK button 925 on the remote controller is pressed (step 203) with the illuminated channel set to be modified by the user, the screen changes to display for editing the channel set (step 204). On this editing display, the value of each item of the channel definition table is modified. In this case, program attributes and information are selected from replaceable candidates (step 205). The modified contents are reflected on the channel definition table 700 and the channel definition display 1000 immediately (step 206).

Operation buttons are displayed on a lower part of the channel definition display. The previous display button 1002 and the following display button 1003 are used when the whole of channel definition table cannot be displayed on the screen. The shapes (hatching, solid line) of the buttons show that there is nothing on the previous display and a channel set is still shown on the following display. The channel definition display is canceled with the end button 1004 and the screen returns to the original display. In other words, until the end button is selected, the user repeats the channel definition.

Figure 4:
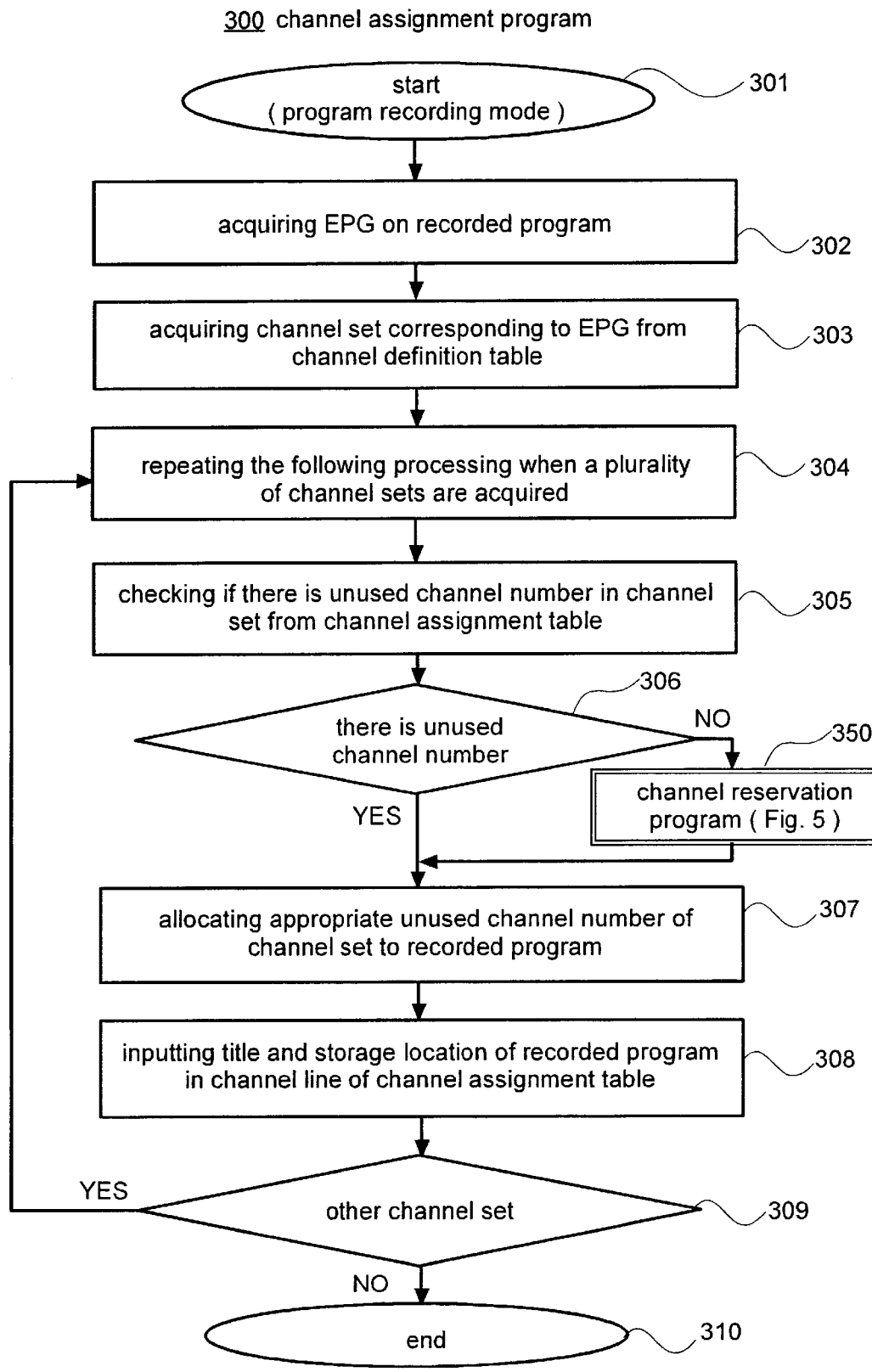
FIG. 4 is a diagram for explaining the processing flow of a channel assignment program in the first, second, third and fourth embodiments of the present invention.

FIG. 4 shows the processing flow of the channel assignment program 300. The program is executed when a program is recorded. When the program is executed (step 301), electronic program information on the recorded program is acquired in step 302. In the following step 303, a channel set corresponding to the electronic program information is acquired with reference to the channel definition table. When a plurality of channel sets are acquired at this point, the steps 305 to 309 are repeated (step 304). In step 305, it is confirmed from the channel assignment table if there are any unused channels in the channel set. When there are unused channels, the routine proceeds to step 307 and when there aren't, the channel reservation program 350 is started (step 306). The channel reservation program will be detailed hereinafter. Stated briefly, the program is for the processing of reserving a channel which seems to be unnecessary for a program to be newly registered. In step 307, an unused channel number in the channel set is allocated to a recorded program. Channel numbers are allocated in the sequential order from a smaller number to a larger number. One channel number is allocated to each program in this embodiment. However, a channel set may have one channel number as described above. In this case, when a channel is selected by the user, (1) a list of corresponding programs (the names, broadcasting times and broadcasting channels of programs) are displayed, (2) the display screen is divided into some parts and the corresponding programs are displayed in the divided parts, and (3) predetermined parts such as initial parts of programs are displayed sequentially. In step 308, information on recorded programs (the titles and storage locations of programs) are input into the channel number line of the channel assignment table 800. In the step 309, it is checked if there are any other channel sets. When there are, the routine returns to the step 304 to repeat the processing and when there aren't, the routine proceeds to step 310 to end the program.

The concept of channel sets is used in FIG. 4 but may not be used. For example, it is confirmed if there is an unused channel number for each program and the channel number is allocated to a recorded program when there is any. Channel number sets are not judged whether or not there is an used channel number but may be allocated according to programs. For example, channel numbers 11 to 20 are allocated to drama programs and channel numbers 21 to 30 are allocated to "Miss So-and-so", performer, according to the program information of FIG. 13. Further, they may be allocated based on the broadcasting station, time and date and the contents of programs (key words). Each channel number may be correlated with each channel set. For example, a certain channel set may have the same first digit number or may be multiples of 3. Channel numbers may be allocated according to programs and not in the sequential order from a smaller number. This is applied whether the concept of channel sets is used or not. Further, channel numbers may be characters (words) other than numerals. The characters include symbols, alphabets and the like.

Figure 5:
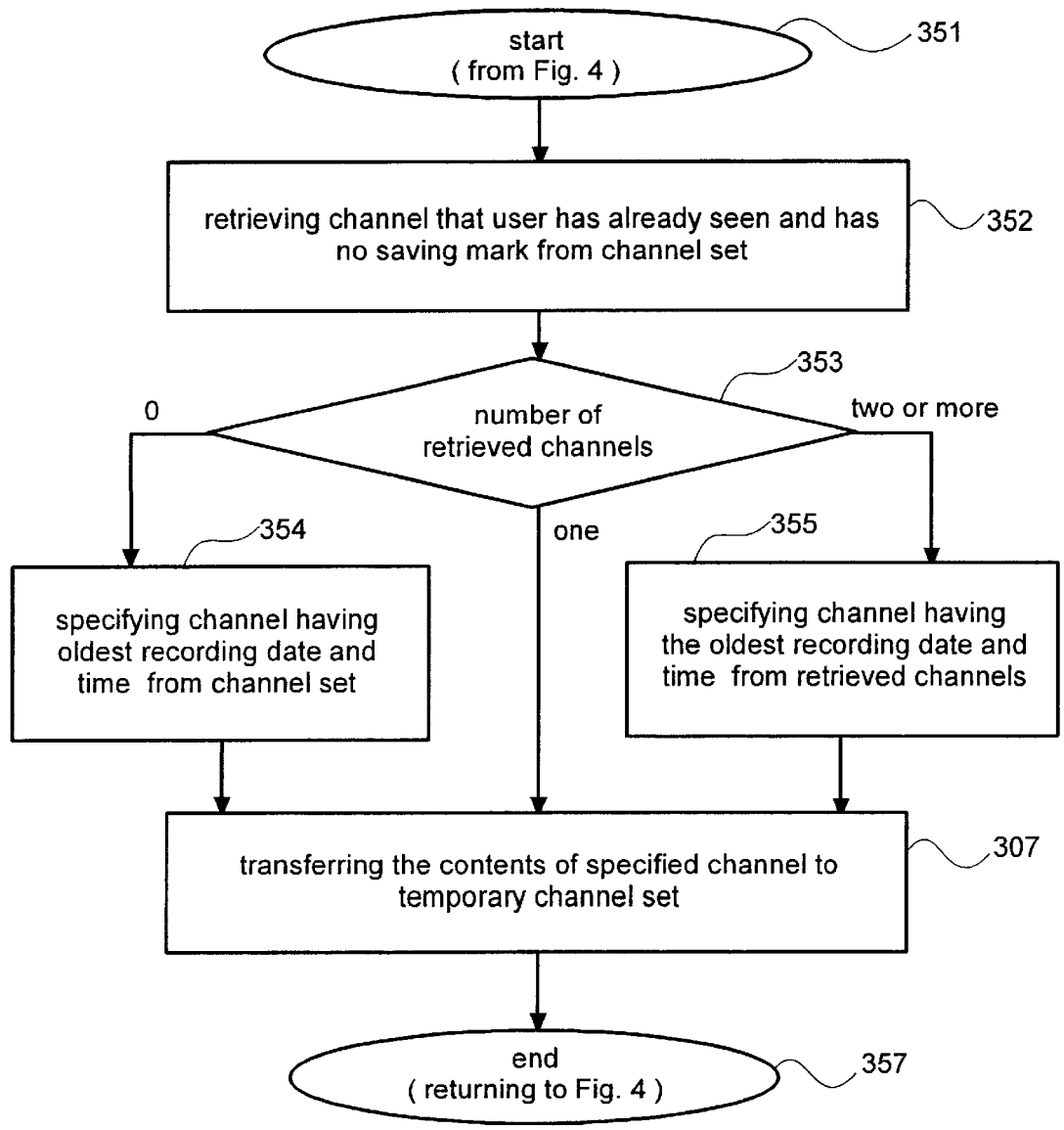
FIG. 5 is a diagram for explaining the processing flow of a channel reservation program in the first, second, third and fourth embodiments of the present invention.

FIG. 5 shows the processing flow of the channel reservation program 350. The program is called from the channel assignment program 300. In the first step 351, when the program is started, channels which belong to the channel set, have already been seen by the user and have no saving mark are retrieved from the channel assignment table. It is judged based on the history of viewing of the channel assignment table whether the channels have already been seen by the user. That is, if the time length of viewing is almost the same as the time length of recording (it is necessary to determine a range in actual operation), it is considered that the program has been seen. For example, in the example of FIG. 14, since the time length of recording of a channel number 081 and the time length of viewing are the same, it is judged that the program "Wakuwaku Dobutsumura" (Exciting Animal Village) has already been seen by the user.

In the following step 353, the number of retrieved channels is counted. When the number of the channels is zero, the routine proceeds to step 354, when the number of the channels is 1, the routine proceeds to step 356, and when the number is 2 or more, the routine jumps to step 355. Since there is no retrieved channel number in step 354, a record channel having the oldest recording date and time is secured from the channel set as a channel candidate. In the step 355, channel having the oldest recording data and time from retrieved channels is specified. In the subsequent step 356, the contents of the candidate channel number are transferred to a temporary channel set. The temporary channel set has a sufficient number of channels to prevent a shortage of channels. Since the user does not erase the recorded programs, only their channel numbers are changed while the recorded programs remain as they are. In the final step 357, the program ends and the routine returns to the channel assignment program of FIG. 4.

Figure 6:
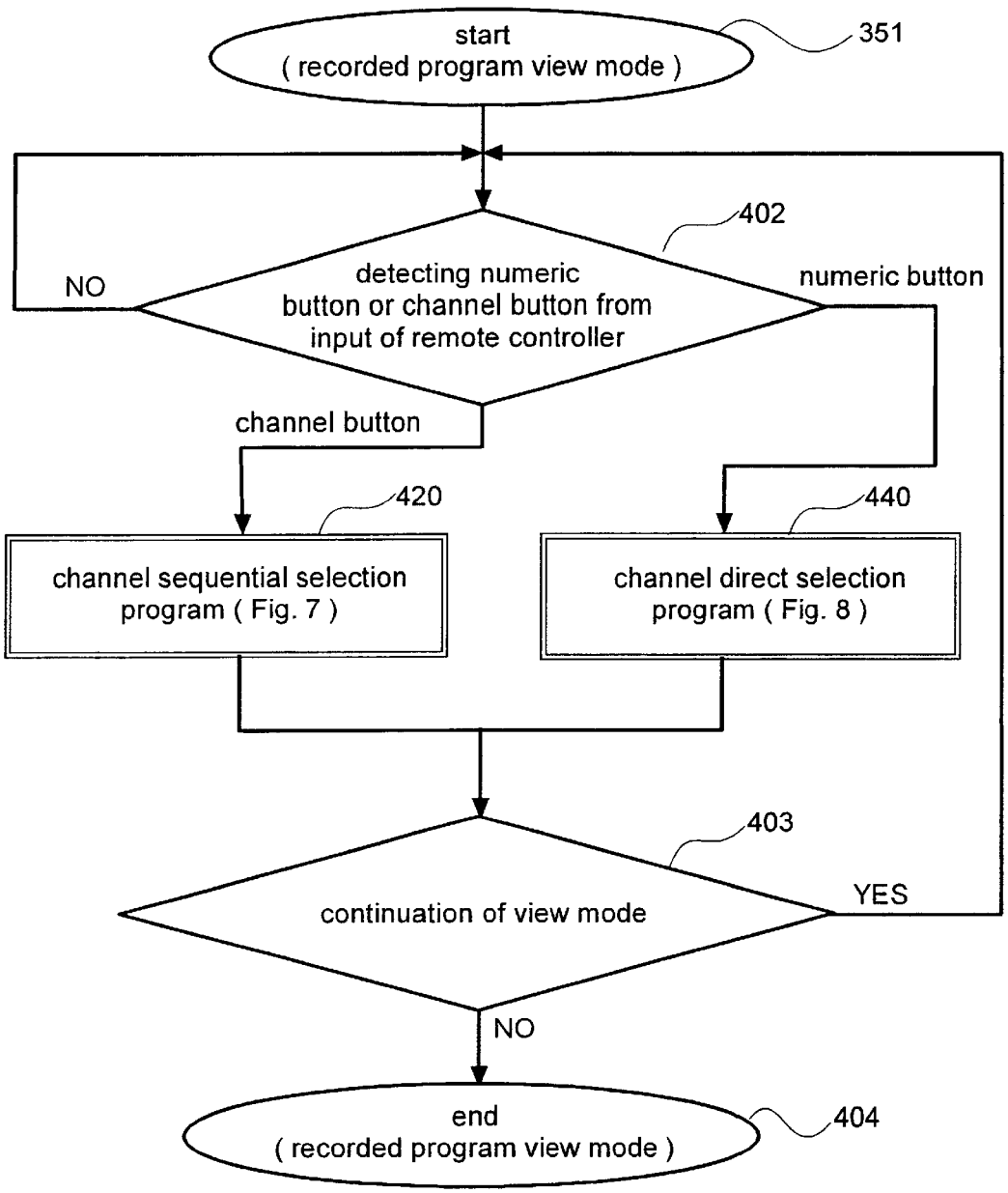
FIG. 6 is a diagram for explaining the processing flow of a channel selection program in the first, second, third and fourth embodiments of the present invention.

Then, FIG. 6 shows the processing flow of the channel selection program 400. The program is started when the user sees a recorded program. That is, the program is always executed while the user sees a recorded program.

Firstly, in the recorded program view mode, the program is executed (step 401). The input of the remote controller is then detected. When it is the channel button, the channel sequential selection program 420 is started. When the input of the remote controller is the numeric button, the channel direct selection program 440 is started. When the input of the remote controller is the volume button or others, the volume control program or other program carries out processing. Then, the input of the remote controller is awaited again (step 402). When the routine returns from the channel sequential selection program 420 and the channel direct selection program 440 in step 403, it is checked if the view mode continues. If it continues, the routine returns to step 402 again to wait for the input of the remote controller. If it does not, the routine proceeds to step 404 to terminate the channel selection program.

Figure 7:
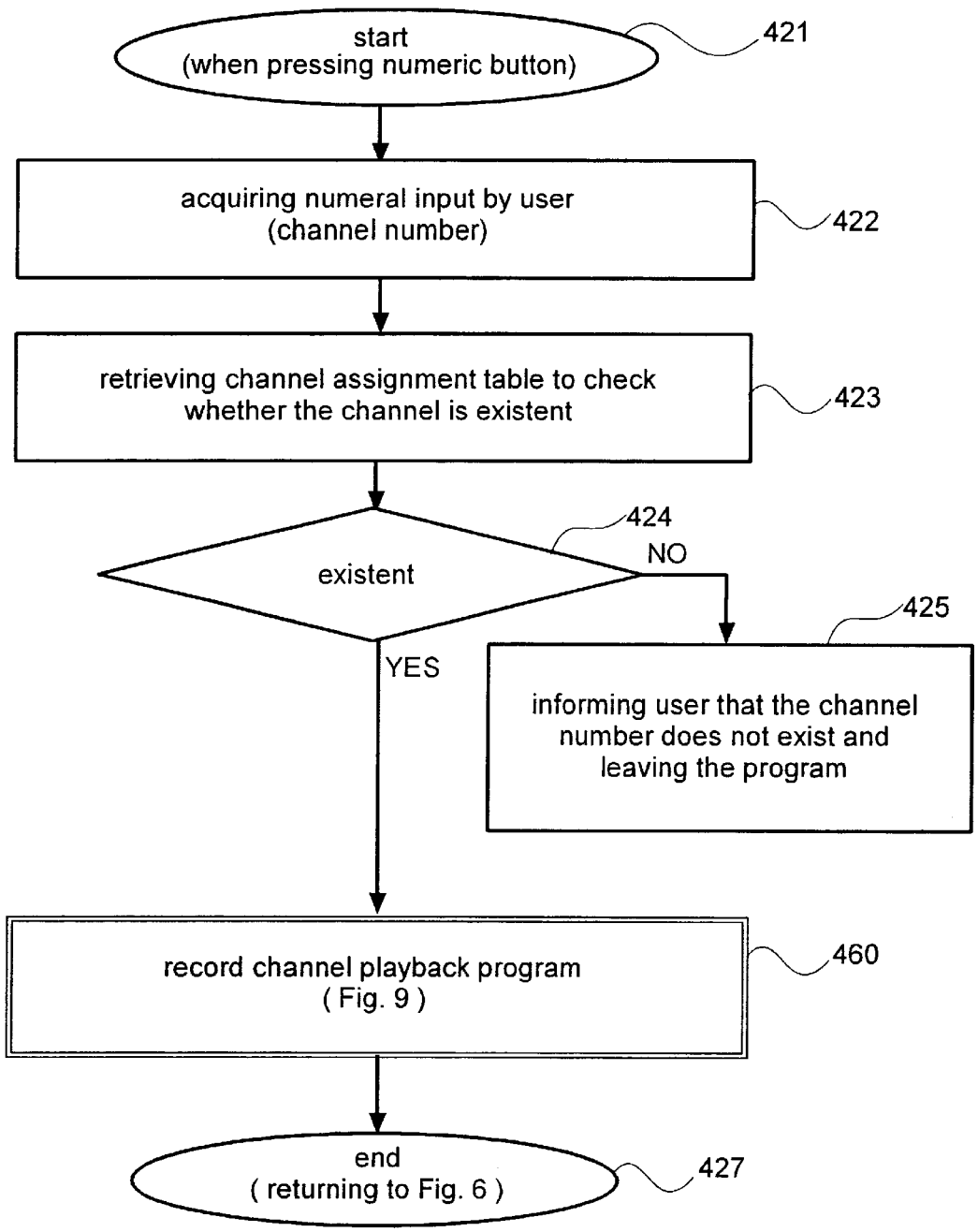
FIG. 7 is a diagram for explaining the processing flow of a channel direct selection program in the first, second, third and fourth embodiments of the present invention.

FIG. 7 shows the processing flow of the channel direct selection program 420. The program is started when the input of the numeric button is detected by the channel selection program 400 (step 421). After the program is started, a numeral input by the user is acquired (step 422). The numeral in this case is a channel number. In the following step 423, it is checked if the channel number exists in the channel assignment table. In step 424, when the channel number exists, the routine proceeds to step 460. When the channel number does not exist, the routine proceeds to step 425 to inform the user of it and leave the program. To inform the user of the absence of the channel number, it is conceivable that a message or icon is displayed. Alternatively, like the current TV receiver, it is conceivable that the screen displays nothing. Subsequently, the record channel playback program 460 is called to play a recorded program corresponding to the channel number input by the user. In the final step 427, the routine returns to the channel selection program 400.

Figure 8:
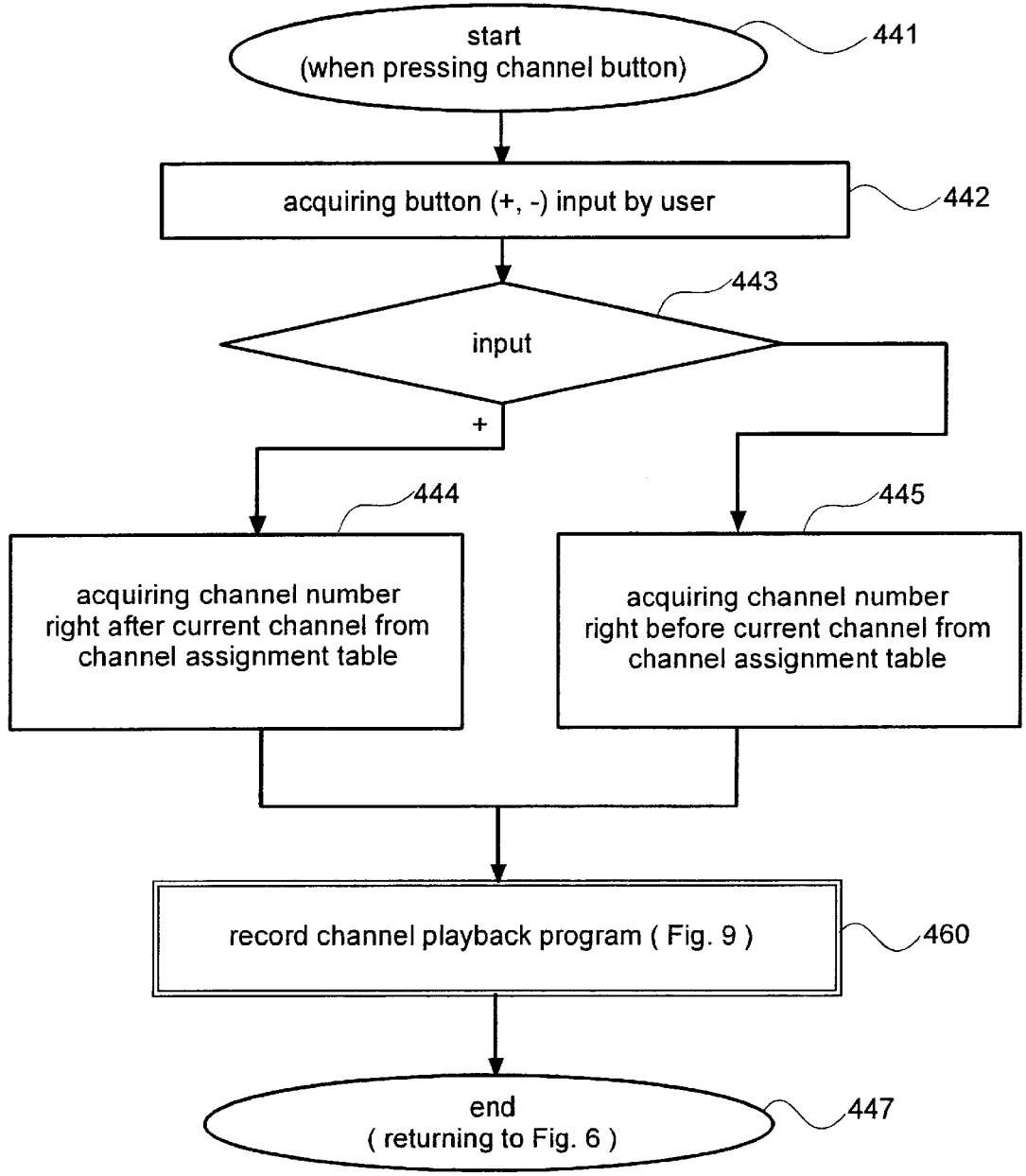
FIG. 8 is a diagram for explaining the processing flow of a channel sequential selection program in the first, second, third and fourth embodiments of the present invention.

FIG. 8 shows the processing flow of the channel sequential selection program 440. The program is started when the input of a channel button is detected by the channel selection program 400 (step 441). After the start of the program, the button ("+" or "−") input by the user is acquired (step 422). The button "+" means the increment of the channel number. The button "−" means the decrement of the channel number. In the following step 443, when the input is the button "+", the routine proceeds to step 444 and when the input is button "−", the routine proceeds to step 445. In step 444, a channel number right after the current channel is acquired from the channel assignment table. In step 445, a channel number right before the current channel is acquired from the channel assignment table. Subsequently, the record channel playback program 460 is called and an appropriate recorded program is played. In the final step 447, the routine returns to the channel selection program 400.

Figure 9:
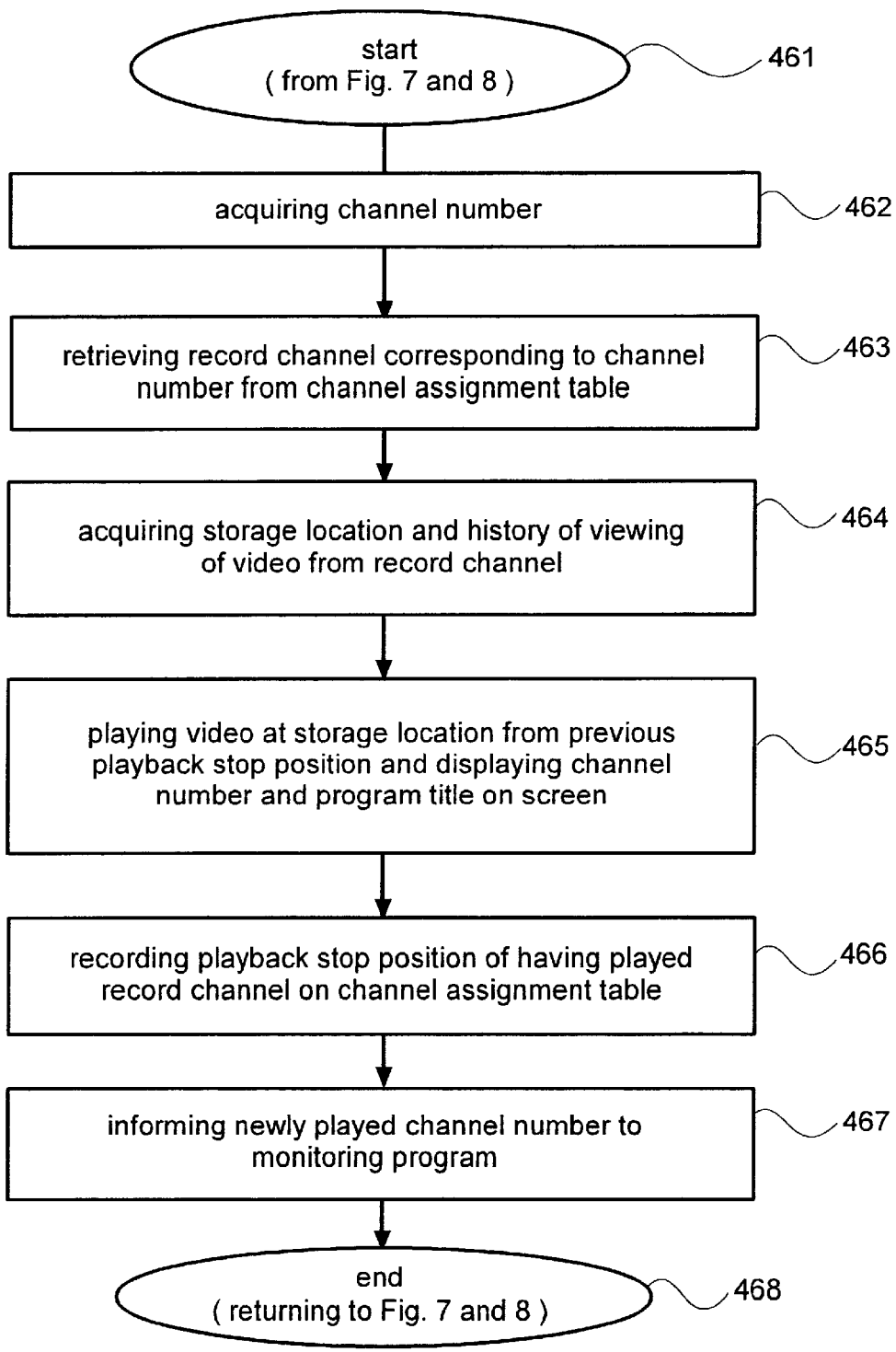
FIG. 9 is a diagram for explaining the processing flow of a record channel playback program in the first, second, third and fourth embodiments of the present invention.

FIG. 9 shows the processing flow of the record channel playback program 460. The program is called from the channel sequential selection program 420 or the channel direct selection program 440 (step 461). A channel number to be played next is delivered (step 462). In the following step 463, a record channel corresponding to the channel number is retrieved from the channel assignment table. In the following step 464, the storage location and the history of viewing of a recorded program are acquired from the record channel. The history of viewing indicates the stop position of a recorded program previously seen by the user. In step 465, the video at the storage location is played from the above stop position. For example, when the user has never seen the record channel, the recorded program is played from the start point. The channel number and the title of the program are displayed using OSD (On Screen Display) to support the user to see the program. In step 466, the stop position is recorded on the channel assignment table because the recorded program which is being played is stopped. In the step 467, newly played channel number to monitoring program is informed. In step 468, the routine returns to the called program. Take into consideration the stop position. Supposing that the video is saved in MPEG, the stop position is existent with a group of pictures as the minimum unit. This is because the GOP is the random accessible minimum unit in MPEG. Therefore, the sequence header provided at the head of GOP is recorded as the stop position.

Figure 10:
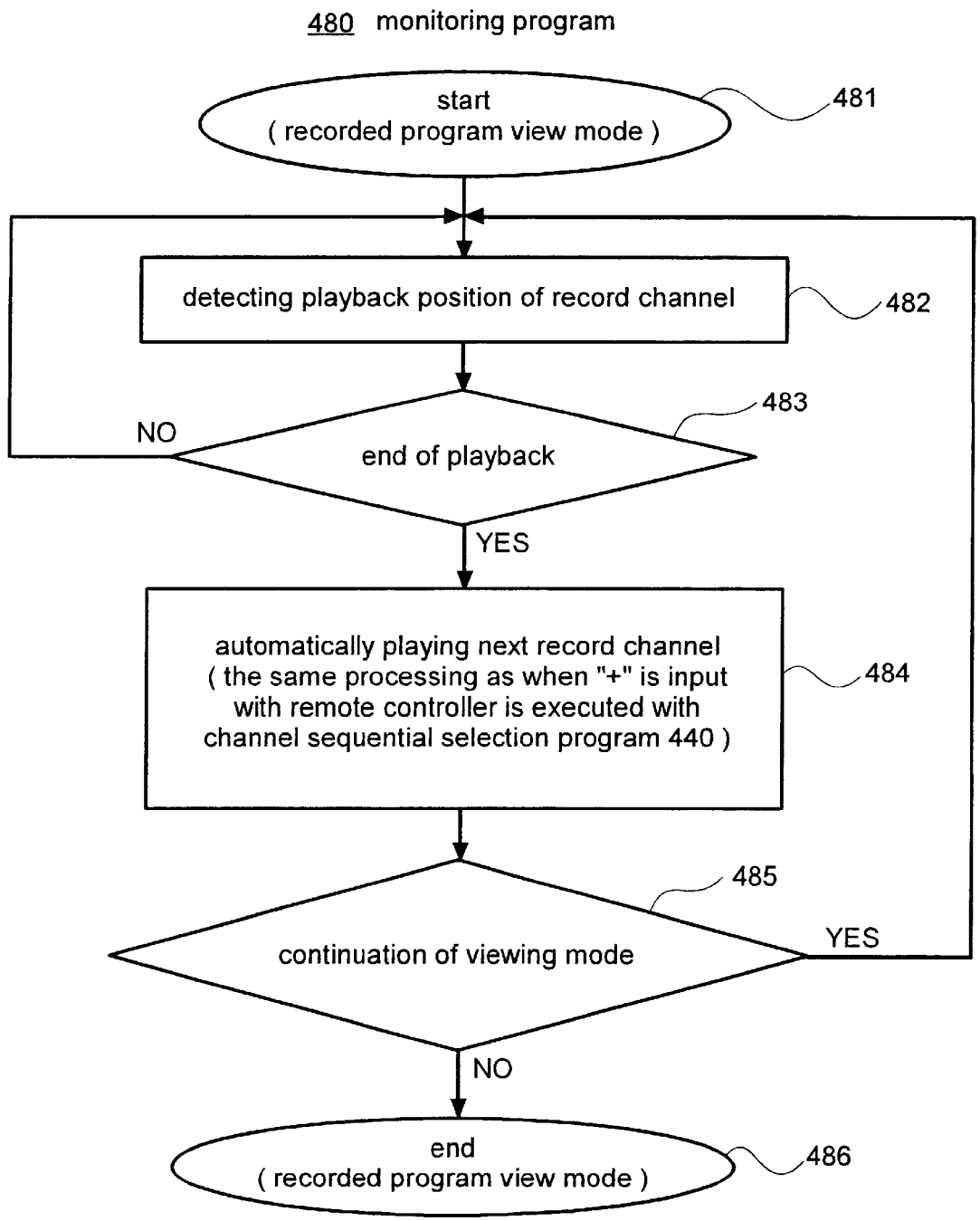
FIG. 10 is a diagram for explaining the processing flow of a monitoring program in the first, second, third and fourth embodiments of the present invention.

FIG. 10 shows a diagram for explaining the processing flow of a monitoring program 480 in the first, second, third and fourth embodiments of the present invention. In the step 481, the monitoring program 480 is started. In the step 482, playback position of record channel is detected. In the step 483, it is checked if playback is ended. In the step 484, next record channel is automatically played. (The same processing as when "+" is input with remote controller is executed with channel sequential selection program 440.) In the step 485, it is checked if viewing mode is continued.

FIG. 17 shows the display of recorded program playback 1100. On the screen, a recorded video 1101 to be played, the channel number and the title of the program 1102 and an icon 1103 indicating the feature of the recorded program are displayed. The channel number is displayed such that the user can understand which record channel is now displayed. The title of the program is displayed such that the user can understand the contents of the recorded program which is now played. The icon is used to tell the user the attributes of the recorded program. For example, when an icon "NEW" is displayed for a recorded program which the user sees for the first time, the user can know that he/she has never seen the program. It is also conceivable that the attributes of a record channel which is recorded in the channel assignment table are displayed.

Figure 11:
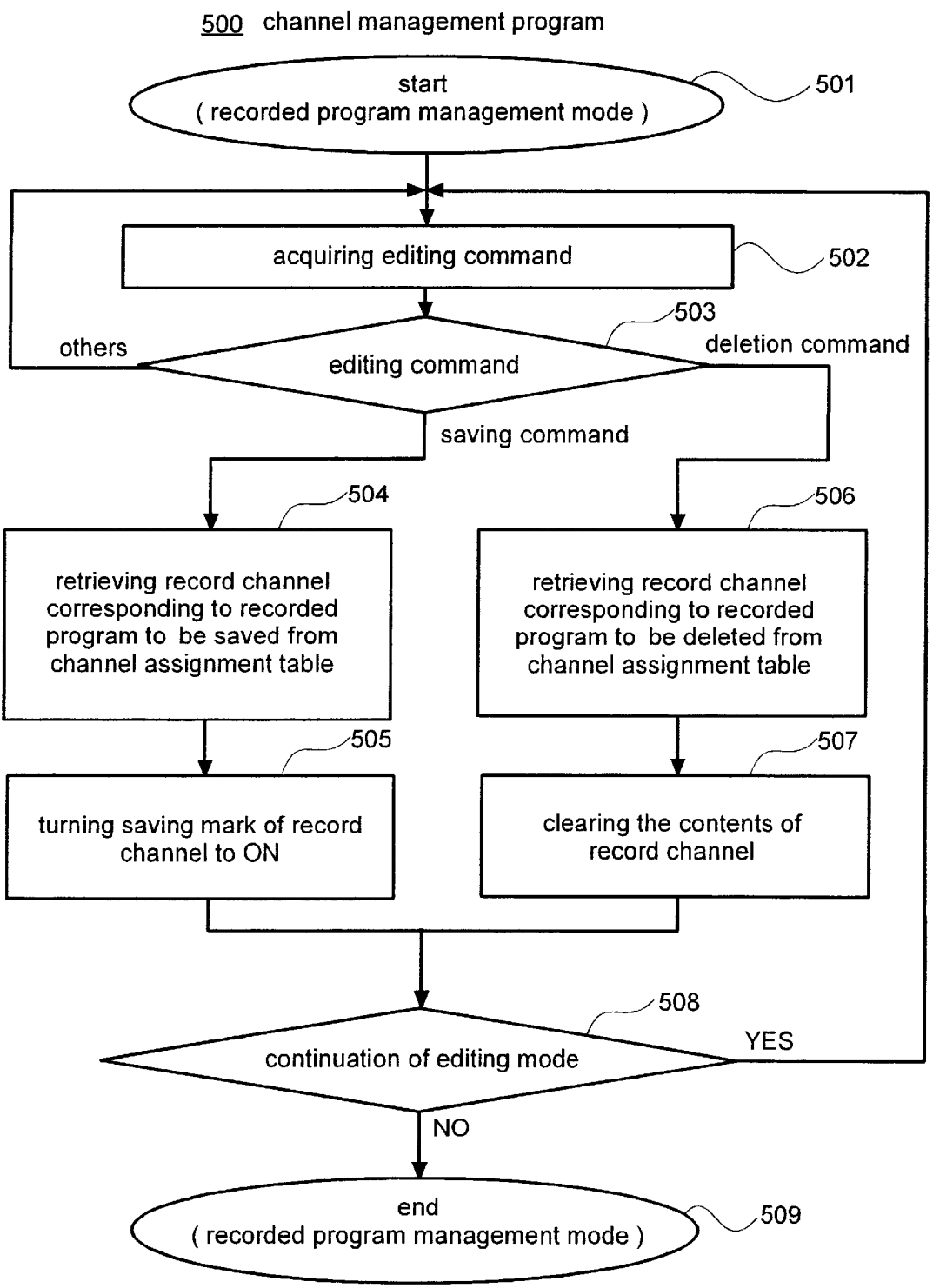
FIG. 11 is a diagram for explaining the processing flow of a channel management program in the first, second, third and fourth embodiments of the present invention.

FIG. 11 shows the processing flow of the channel management program 500. The program is started in a video management mode (step 501). In step 502, an editing command is acquired. In the following step 503, only a deletion command and a saving command are detected and the routine returns to step 502 for stand-by in case of other commands. In this embodiment, only deletion and saving commands are detected. All the commands which have an influence upon the channel assignment table are detected here and appropriate processing for maintaining the fitness of the channel assignment table is carried out. For example, when the editing command is to save a recorded program, the routine proceeds to step 504 to retrieve a record channel corresponding to the recorded program to be saved from the channel assignment table. In step 505, the saving mark of the record channel is set ON. The saving mark is OFF initially. Similarly, when the deletion of a recorded program is detected as the editing command, the routine proceeds to step 506 to retrieve a record channel corresponding to the recorded program to be deleted from the channel assignment table. In step 507, the contents of the record channel are cleared. After the steps 505 and 507, it is checked if the editing mode still continues in step 508. When the mode still continues, the routine returns to step 502 for stand-by and when the mode does not continue, the program ends together with the editing mode (step 509).

Figure 18:
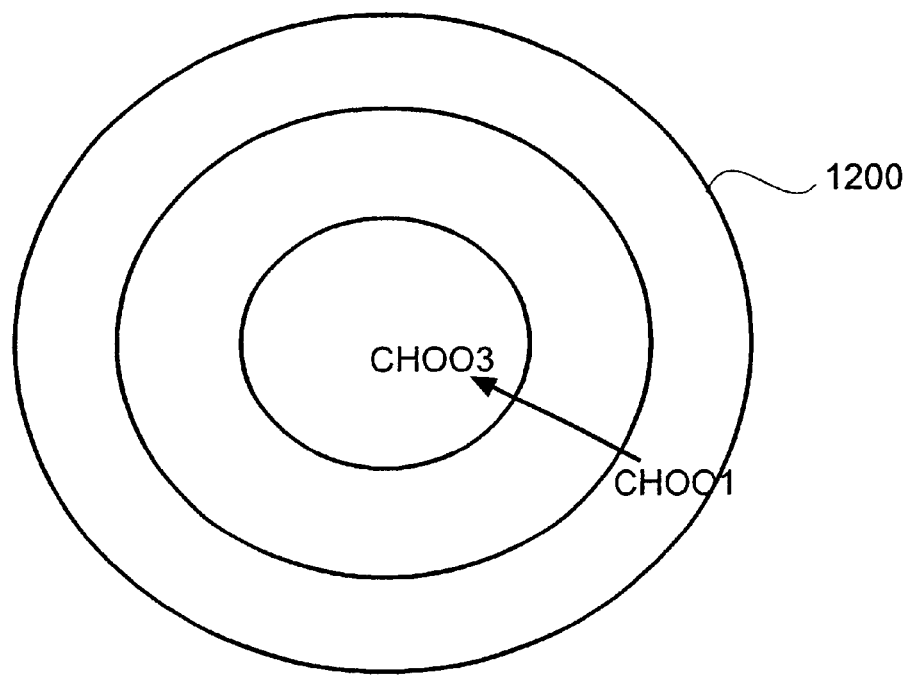
FIG. 18 is a diagram for explaining the concept of disk access in the first, second, third and fourth embodiments of the present invention.

FIG. 18 shows the concept of disk access. In the disk access method, only seek is carried out without wait for rotation. At the time of switching the channel, the channel is jumped to the closest portion of the channel and a video is started on the way, which is accepted because the user is searching for an appropriate program.

(The Second Embodiment)

In the second embodiment, the recorded video viewing support system of the present invention is applied to a TV display device 121 having a video playing and recording function.

Figure 20:
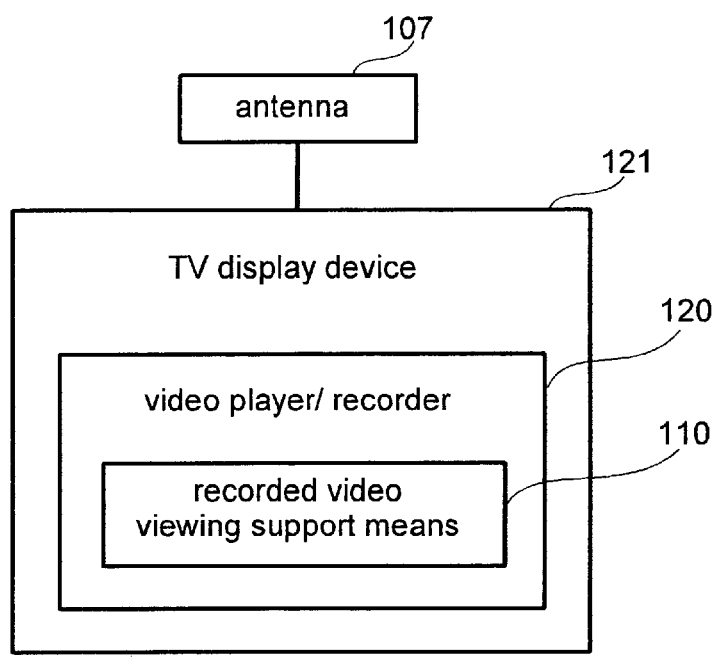
FIG. 20 is a diagram for explaining the constitution of an apparatus according to the second embodiment of the present invention.

FIG. 20 shows the constitution of the apparatus of this embodiment. The TV display device 121 incorporates a video player/recorder 120. The video player/recorder 120 has recorded video viewing support means 110. The constitution of the video player/recorder 120 is almost identical to that of Embodiment 1. However, the video player/recorder 120 must be reduced in size and incorporate countermeasures against the noise and vibration of a storage device and a countermeasure against heat for control means to incorporate it in the TV display device 121. The constitutions of data tables and the processing flows of the programs in the recorded video viewing supporting means 110 are as described in the first embodiment.

(The Third Embodiment)

In the third embodiment, the recorded video viewing support system of the present invention is carried out as computer software.

Figure 21:
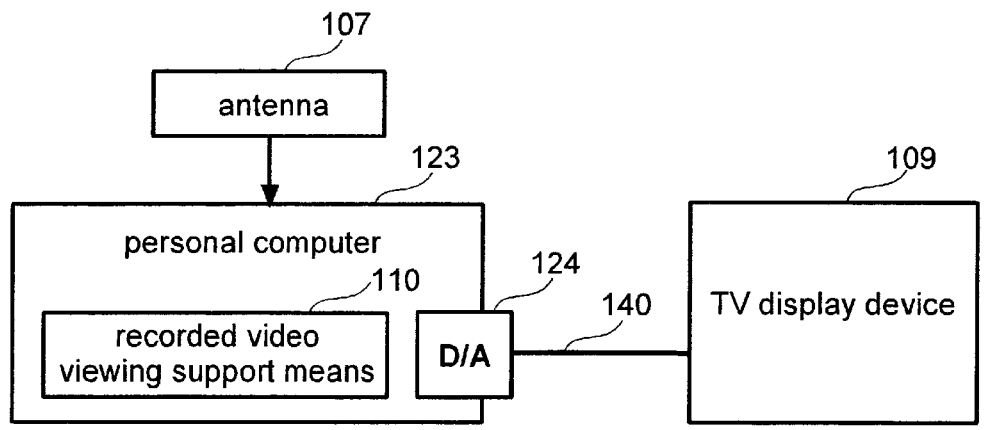
FIG. 21 is a diagram for explaining the constitution of an apparatus according to the third embodiment of the present invention.

FIG. 21 shows the constitution of the apparatus of this embodiment. A personal computer 123 which is now widespread to households is used as a computer. The personal computer 123, has hardware which is connected to an antenna 107 to receive TV broadcasting. The personal computer 123 also has a DA converter 124 to output a video to a TV display device 109. The DA converter serves to convert the VGA output of the personal computer into NTSC signals. Therefore, the personal computer 123 and the TV display device 109 can be connected to each other by an ordinary AV cable 140.

The constitutions of data tables and the processing flows of the programs in the recorded video viewing support means 110 are as described in the first embodiment. The control means 112 is a microprocessor.

As a variation of the third embodiment, it is conceivable that the personal computer is connected to a display for personal computers and not the TV display device 109. In this case, the output of the personal computer may be ordinary VGA as the constitution is ordinary.

It is further conceivable that EPG receiving means 101 is used as a network connector. In this constitution, program information such as EPG can be acquired from a server on the network. The internet or the like is used as the network. In Embodiments 1, 2, 4 and 5, EPG may be acquired through the network.

(The Fourth Embodiment)

In the fourth embodiment, the recorded video viewing support system of the present invention is applied to a video server 125. The video server 125 is a device for distributing a video to a plurality of terminals connected by the network.

Figure 22:
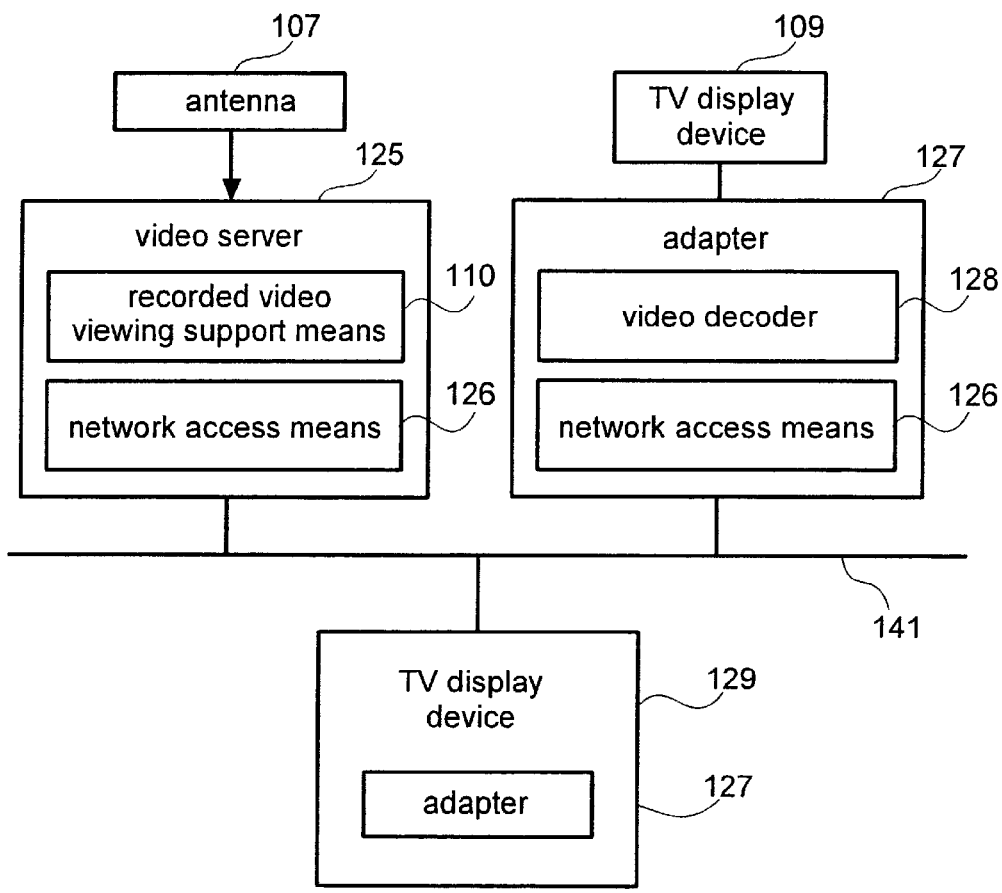
FIG. 22 is a diagram for explaining the constitution of an apparatus according to the fourth embodiment of the present invention.

FIG. 22 shows the constitution of the apparatus of this embodiment. The video server 125 comprises the recorded video viewing support means 110 described in Embodiment 1, network access means 126 and server management software. The server management software is a group of programs for processing service requests from terminals and processes the storage and distribution of a video. The network 141 is a LAN, IEEE1394 or the like.

The terminal is a TV display device 109 having an adapter 130 as an external unit or a TV display device 127 incorporating an adapter 130. The adapter 130 consists of network access means 126 and a video decoder 128. The video decoder 128 converts a video signal from the server into a signal to be transmitted to the TV display device. For example, when a video signal is MPEG stream data, the video decoder 128 is a MPEG decoder.

(The Fifth Embodiment)

In the fifth embodiment, the recorded sound selection support system of the present invention is applied to a radio sound player/recorder 130.

Figure 23:
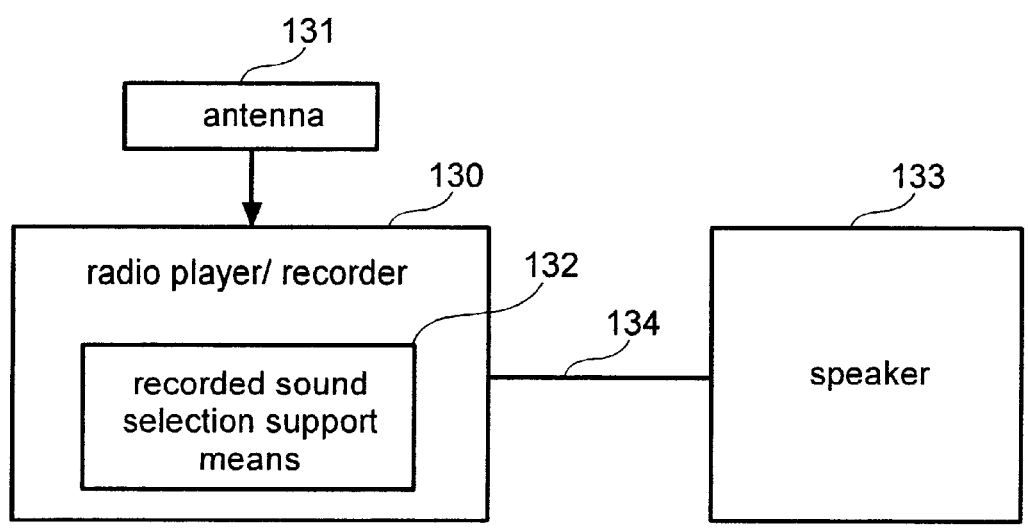
FIG. 23 is a diagram for explaining the constitution of an apparatus according to the fifth embodiment of the present invention.

FIG. 23 shows the constitution of the apparatus of this embodiment. The radio player/recorder 130 records a radio program received from the antenna 131 and plays the recorded program (recorded radio program) to output it from a speaker 133. Recorded sound selection supporting means 132 is incorporated in the radio player/recorder 120. The constitutions of data tables and the processing flows of programs in the recorded sound selection supporting means 132 are the same as those of the first embodiment except that video recording-related portions are replaced by sound recording-related portions.

Since the recorded video viewing support system of the present invention is to select a recorded program based on a channel like conventional TV broadcasting, operation is easy. As the contents of a program can be selected by specifying a channel number, it is easy to find a desired recorded program. Further, zapping processing for searching for a desired recorded program by changing the channel at random is possible with the video player/recorder like an ordinary TV.

What is claimed is:

1. A recorded video viewing support method for a video recorder for recording a video, comprising the steps of:
   classifying electronic video information on videos corresponding to each unit video based predetermined criteria of video classification;
   assigning class numbers according to classification results to unit videos to be recorded and storing them; and
   playing the recorded unit videos based on the stored class numbers.

2. A video recorder for recording a video, comprising:
   means of recording the video;
   means of classifying electronic video information on videos corresponding to each unit video based on predetermined criteria of video classification; and
   means of assigning class numbers according to classification results to unit videos to be recorded and storing them.

3. The video recorder of claim 2, wherein the video is a TV program and the electronic video information is electronic program-information superimposed on the TV program and broadcast.

4. The video recorder of claim 3, wherein the recorded program is played by inputting a channel number corresponding to a stored class number.

5. The video recorder of claim 4, wherein the channel number is the class number.

6. The video recorder of claim 4, wherein the input of the channel number is carried out by a device in which the channel number of a TV receiver used in conjunction with the video recorder is input.

7. The video recorder of claim 6, wherein when the channel of a TV program on the air is selected while a recorded TV program is played, the playing of the recorded TV program is suspended.

8. The video recorder of claim 6, wherein the video recorder can play a recorded video.

9. The video recorder of claim 4, wherein the playing of the recorded program is resumed at a location where playing has been suspended when the program is played at least once.

10. The video recorder of claim 4, wherein the playing of the recorded program is started from the beginning of the program.

11. The video recorder of claim 4, wherein either the class numbers or the channel numbers are assigned to correlated programs and the numbers are correlated each other.

12. The video recorder of claim 11, wherein the correlated numbers are a predetermined number of sequential numerals.

13. The video recorder of claim 4, wherein only one of either the class numbers or the channel numbers is assigned to a plurality of programs.

14. The video recorder of claim 4, wherein the channel numbers are different from the channel numbers of receivable broadcasting stations.

15. The video recorder of claim 4, wherein predetermined numbers different from those of TV programs are assigned to videos to be input into the video recorder which are not superimposed by the electronic program information as either the class numbers or the channel numbers.

16. The video recorder of claim 4, wherein the video recorder can output a video recorded on a detachable recording medium, and when there is no electronic program information on the video recorded on the recording medium, a predetermined number is assigned as at least one of the class number and the channel number.

17. A recorded video viewing support apparatus which can be connected to a TV program player/recorder for recording a TV program and playing the recorded TV program and supports the TV program player/recorder to record a TV program, the apparatus comprising:
   means of classifying broadcast TV programs and electronic program information corresponding to the TV programs based on predetermined criteria of video classification; and means of assigning class numbers according to the results of classification to TV programs to be recorded.

18. The recorded video viewing support apparatus of claim 17 which comprises means of outputting the assigned class number to the TV program player/recorder.

19. The recorded video viewing support apparatus of claim 17, wherein the apparatus comprises means of storing the assigned class numbers and the TV program player/recorder plays a TV program recorded by the TV program player/recorder based on the stored class number and a number correlated to the class number and input from a viewer.

20. A video recording medium which can record video information and can be played by a video player, wherein class numbers according to the results of classifying electronic video information on videos related to recorded video information based on predetermined criteria of video classification are assigned to recorded video information and stored; and when the channel selection button of the remote controller of the video player or a TV receiver used in conjunction with the video player is selected, if the selected number is a stored class number, the video information is played.

* * * * *